United States Patent
Dorn et al.

(10) Patent No.: US 6,772,207 B1
(45) Date of Patent: Aug. 3, 2004

(54) SYSTEM AND METHOD FOR MANAGING FIBRE CHANNEL SWITCHING DEVICES

(75) Inventors: Wendy Y. Dorn, San Jose, CA (US); Paul Ramsay, Fremont, CA (US); Ezio Valdevit, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 09/239,463

(22) Filed: Jan. 28, 1999

(51) Int. Cl.[7] .............................................. G06F 15/173
(52) U.S. Cl. ...................... 709/224; 709/223; 370/254; 340/825.06; 714/39; 714/45; 714/47
(58) Field of Search ................. 709/223, 224, 709/300, 316, 315; 370/254; 340/825.06; 714/39, 47, 45

(56) References Cited

U.S. PATENT DOCUMENTS

| | | | |
|---|---|---|---|
| 5,471,617 A | 11/1995 | Farrand et al. .............. 395/700 |
| 5,500,934 A * | 3/1996 | Austin et al. ................ 395/326 |
| 5,559,958 A | 9/1996 | Farrand et al. ......... 395/183.03 |
| 5,634,010 A | 5/1997 | Ciscon et al. .......... 395/200.15 |
| 5,651,006 A | 7/1997 | Fujino et al. ................ 370/408 |
| 5,671,414 A | 9/1997 | Nicolet ........................ 395/684 |
| 5,675,798 A | 10/1997 | Chang .......................... 395/680 |
| 5,694,615 A | 12/1997 | Thapar et al. ............... 395/822 |
| 5,706,455 A * | 1/1998 | Benton et al. ............... 345/348 |
| 5,737,518 A | 4/1998 | Grover et al. .......... 395/183.14 |
| 5,802,291 A | 9/1998 | Balick et al. ........... 395/200.32 |
| 5,873,084 A * | 2/1999 | Bracho et al. .................. 707/10 |
| 5,887,139 A * | 3/1999 | Madison, Jr. et al. ........ 709/223 |
| 5,905,867 A * | 5/1999 | Giorgio ........................ 709/224 |
| 5,905,890 A * | 5/1999 | Seaman et al. .............. 395/704 |
| 5,933,601 A | 8/1999 | Fanshier et al. ........ 395/200.53 |
| 5,974,237 A | 10/1999 | Shurmer et al. ........ 395/200.54 |
| 5,974,457 A * | 10/1999 | Waclawsky et al. ......... 709/224 |
| 5,987,513 A * | 11/1999 | Prithviraj et al. ............ 709/223 |
| 5,999,179 A * | 12/1999 | Kekic et al. ................. 345/349 |
| 6,005,849 A | 12/1999 | Roach et al. ................ 370/276 |
| 6,020,889 A * | 2/2000 | Tarbox et al. ............... 345/356 |
| 6,049,828 A * | 4/2000 | Dev et al. .................... 709/224 |
| 6,052,722 A | 4/2000 | Taghadoss ................... 709/223 |
| 6,105,061 A | 8/2000 | Nakai .......................... 709/223 |
| 6,118,776 A | 9/2000 | Berman ....................... 370/351 |
| 6,122,664 A * | 9/2000 | Boukobza et al. ........... 709/224 |
| 6,145,098 A | 11/2000 | Nouri et al. ................... 714/31 |
| 6,151,023 A * | 11/2000 | Chari ........................... 345/349 |
| 6,181,776 B1 * | 1/2001 | Crossley et al. ............... 379/34 |
| 6,272,537 B1 * | 8/2001 | Kekic et al. ................. 709/223 |
| 6,381,635 B1 * | 4/2002 | Hoyer et al. ................. 709/207 |

* cited by examiner

Primary Examiner—Saleh Najjar
(74) Attorney, Agent, or Firm—Wong, Cabello, Lutsch, Rutherford & Brucculeri, L.L.P.

(57) ABSTRACT

A system for remotely managing a device over a network comprises a data sampling engine, for receiving new data from the device, the new data corresponding to a component module of the device; a model object, coupled to the data sampling engine, for comparing the new data from the device with old data; and a view object, coupled to the model object, for updating the graphical representation of the device corresponding to the component module of the device. In a preferred embodiment, the device is a fiber channel switch. A method for managing a network device comprises the steps of: receiving new device data from the data sampling engine, the new device data corresponding to information regarding a particular module of the device; comparing the new device data with a set of old device data, the old device data corresponding to information which was received prior to receiving the new device data and which regards the particular module of the device; and transmitting a notification signal to the view object.

23 Claims, 12 Drawing Sheets

Port Information for int211

| Port 0 | Port 1 | Port 2 | Port 3 | Port 4 | Port 5 | Port 6 | Port 7 | Port 8 |

General Information

| | |
|---|---|
| Port Number: | 8 |
| Port Status: | Online |
| Port Type: | G-Port |
| Port Module (or GBIC Module) | sw |
| Port World Wide Name | 20:08:00:60:69:00:06:57 |

Interrupt Statistics

| | |
|---|---|
| Interrupts: | 41128 |
| Unknown: | 42523 |
| Li: | 41305 |
| Proc_rqd: | 0 |
| Timed_out | 0 |
| Rx_flushed: | 19731 |
| Tx_unavail: | 0 |
| Free_buffer | 39338 |
| Overrun: | 0 |
| Suspended: | 0 |
| Parity_err: | 0 |

Frame Statistics

| | |
|---|---|
| Frjt: | 0 |
| Fbsy: | 0 |

Error Statistics

| | |
|---|---|
| Link_Failure: | 0 |
| Loss_of_sync: | 0 |
| Loss_of_sig: | 0 |
| Protocol_err: | 922 |
| Invalid_word: | 0 |
| Invalid_crc: | 0 |
| Delim_err: | 363 |
| Address_err: | 0 |
| Li_in: | 0 |
| Li_out: | 0 |
| Ols_in: | 0 |
| Ols_out: | 0 |

[Admin] [Performance] [Done]

Java Applet Window

FIG. 10

SYSTEM AND METHOD FOR MANAGING FIBRE CHANNEL SWITCHING DEVICES

BACKGROUND OF THE INVENTION

1. Field of the Invention

The present invention relates generally to systems and methods for managing devices over a network system. More particularly, the present invention relates to systems and methods for remotely managing fibre channel switching devices over a network system.

2. Description of the Related Art

The widespread use of computer network systems has opened new avenues for business level communications and electronic commerce. Organizations are increasingly relying on computer network systems to accomplish various tasks such as mass storage, medical and scientific imaging, multimedia communication, transactional processing, distributed computing and distributed database processing applications. One type of network technology is based on the Fibre Channel family of standards (developed by the American National Standards Institute (ANSI)) which defines a high speed communications interface for the transfer of large amounts of data between a variety of hardware systems such as personal computers, workstations, mainframes, supercomputers, storage devices and servers. Thus, Fibre Channel is an alternative to conventional channel and network connectivity technologies and is used to deliver high-speed and low latency connectivity among many clients.

Since the acceptance of the Fibre Channel interconnect in computing environments, switches are becoming the device of choice for storage and server interconnection. Just like within a network environment, such as a Local Area Network (LAN) or Wide Area Network (WAN), one or more fibre channel switches furnish the backbone for all connected devices in a Storage-Server Area Network (SAN).

One key issue in networking is the ability to manage the network system. Several tools and systems have been developed to manage network devices via a Simple Network Management Protocol (SNMP), Small Computer Systems Interface enclosure services (SES), or Telnet. Such methods furnish detailed information on device status, performance levels, configuration and topology changes, and historical data. However, conventional management tools and systems typically use a static page, i.e. text only, to provide information regarding a particular device. While the use of dynamic pages for furnishing device information would be desirable, the use of large scale graphic animation for managing network devices causes "screen flickering" due to the large amounts of data which need to be redrawn on a display monitor. Additionally, most graphic management tools require separate client software installation because of their platform dependency. Further, most networking management packages do not provide automatic, dynamic device information update.

The World Wide Web ("Web"), as well as other wide-area networks (WANs) provide, a rapid, low cost communication mechanism for remotely managing network devices. Ideally, an effective network management system should allow use of WANs to further facilitate the network management process. Moreover, the introduction of Java has made it possible to distribute platform independent executable content over networks thus enabling continuous, real-time interaction with Web pages. Thus, an effective management system should also allow use of Java to improve the network management process.

Therefore, there is a need for a system and method for remotely managing a network device such as a fibre channel switch. Moreover, there is a need for a system and method that is platform independent, utilizes dynamic graphical pages which reduce screen flickering, and automatically updates the information furnished to the user.

SUMMARY OF INVENTION

The present invention overcomes the limitations and shortcomings of the prior art with a system and method for managing a network device. A system and method embodying the principles of the present invention enables a user to remotely manage a device over a network. In a preferred embodiment, the device is a fibre channel switch, and the present invention enables a user to perform administrative functions with respect to the fibre channel switch, such as viewing on a display the fabric topology, the front panel of the switch, individual port and total switch traffic, retrieving information about the switch status and enclosures, and configuring the switch and ports of the switch. Moreover, the present invention is platform independent and enables a user to remotely manage a device using graphical web pages with dynamic status update without screen flickering.

A system embodying the principles of the present invention comprises a data sampling engine, for receiving new data from the device which corresponds to a component module of the device; a model object, coupled to the data sampling engine, for comparing the new data from the device with old data; and a view object, coupled to the model object, for updating the graphical representation of the device corresponding to the component module of the device. In a preferred embodiment, the device is a fibre channel switch and includes four model objects, a SwitchModel, a PortModel, a FanModel, and a ThermoModel for processing and storing data concerning general information about the switch, ports in the switch, fans in the switch, and a thermometer in the switch, respectively. Preferably, the present invention also includes a SwitchView object, three FanView objects, a ThermoView object, 16 PortLEDView objects, 16 PortModelView objects, 8 PortLoopSymbol objects, a PortAlert object, a PortPerformanceView object, and a PortDetailView object, for graphically displaying the corresponding component module and its status on a display.

The present invention also comprises a method for managing a network device. The preferred method for managing a network device comprises the steps of: receiving new device data from the data sampling engine corresponding to information regarding a particular component module of the device; comparing the new device data with a set of old device data, the old device data corresponding to information which was received prior to receiving the new device data and which regards the particular component module of the device; and transmitting a notification signal to the view object.

These and other advantages may be better understood by reference to the following detailed description.

DESCRIPTION OF THE PREFERRED EMBODIMENT

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
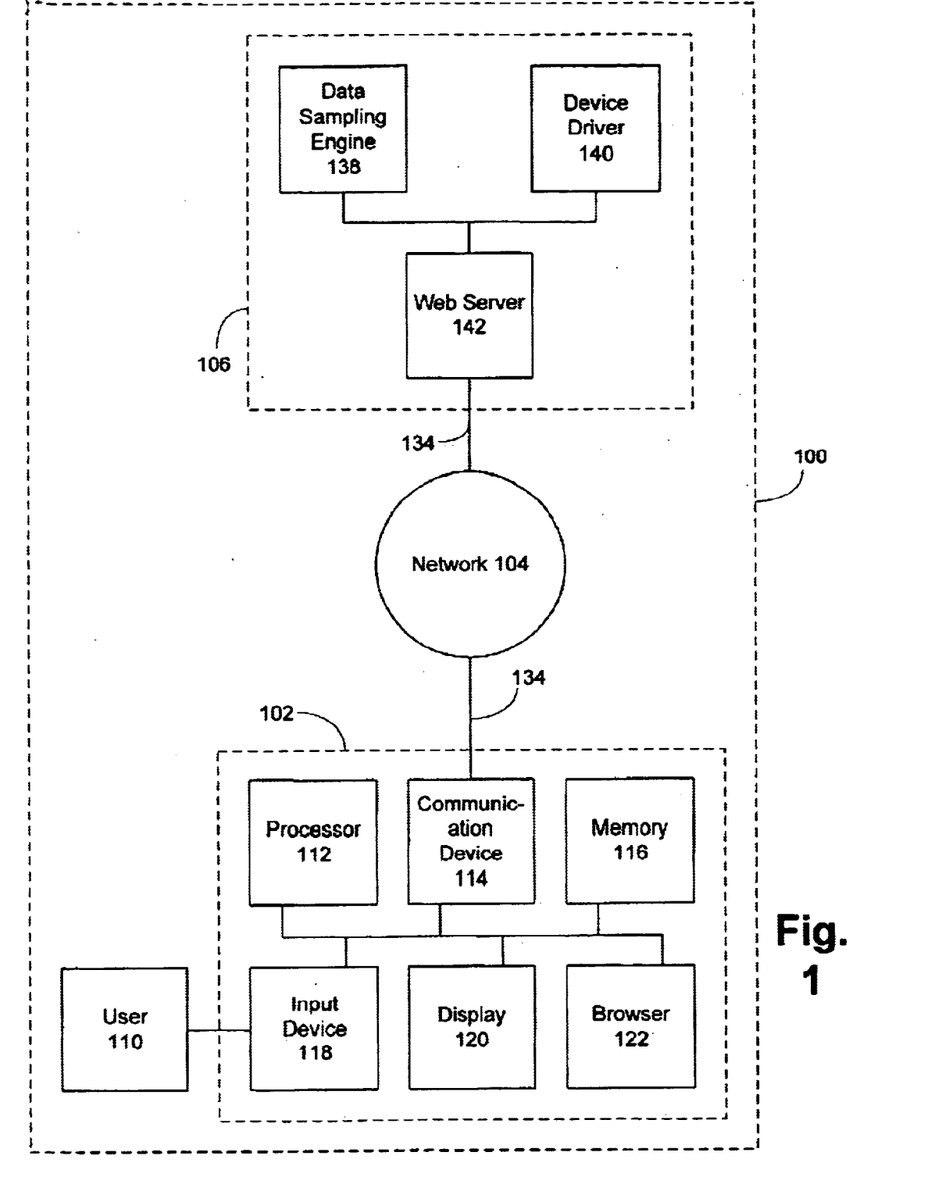
FIG. 1 illustrates a computer network system in accordance with the present invention.

Referring now to FIG. 1, a preferred hardware embodiment of a network system 100 in accordance with the present invention is shown. System 100 comprises a client 102, a network 104, and a network device 106.

Client 102 preferably comprises a workstation which is readily accessed by a user 110. Client 102 preferably comprises a processor 112, a communications device 114, a memory 116, an input device 118, a display 120, and a browser 122 all interconnected via a bus 124. Client 102 may be any conventional terminal such as a personal computer (PC). Communication device 114 is preferably a modem or alternatively, a network adapter. Input device 118 may be any type of conventional input or pointing device such as a keyboard, tablet, or touch screen, and in a preferred embodiment, is a mouse. Input device 118 is used to transmit user commands from user 110 to the processor 112 for processing. Memory 116 is used to store application programs, operations systems, and/or data. Display 120 is used to display texts, graphics, or video to user 110 and can be any conventional display device. Browser 122 is any software program for accessing, interacting with, and observing the Web, and is preferably a Java-enabled browser, such as the Netscape Navigator Web browser offered by Netscape Communications Corp., in Mountain View Calif. Processor 112, communications device 114, workstation memory 116, input device 118, display 120 and browser 122 are all conventional parts commercially available.

Client 102 and network device 106 are coupled to network 104 via a physical cable 134. Network 104 may be any type of computer network system such as a local area network (LAN), a wide area network (WAN), or a storage-server area network (SAN), and is preferably a LAN. One skilled in the art will realize that other configurations of a client coupled to a network device could also be used within the scope of the present invention. For example, client 102 and network device 106 may be coupled to network 104 via a Radio Frequency connection instead of or in addition to the physical cable 134.

Network device 106 may be any type of hardware device requiring remote management over a network and in a preferred embodiment is a fibre channel switch such as that sold by Brocade Communications Systems, Inc. of San Jose, Calif. Device 106 comprises a data sampling engine 138, a device driver 140, and a Web server 142. Web server 142 provides information or services based on requests from client 102 over network 104. The operation of data sampling engine 138 and device driver 140 is described below in more detail with reference to FIG. 3.

System 100 enables user 110 to remotely manage device 106 over network 104. In other words, user 110 is able to use the present invention to perform administrative functions with respect to device 106. In a preferred embodiment, device 106 is a fibre channel switch, and the present invention enables user 110 to perform administrative functions with respect to the fibre channel switch, such as viewing on display 120 the fabric topology, the front panel of the switch, individual port and total switch traffic, identifying types of ports and Gigabit Interface Converter (GBICs) modules installed, retrieving information about switch status and enclosures, and configuring the switch and ports.

To remotely manage device 106, user 110 submits a request via input device 118 to client 102 to access device 106. Input device 118 transmits the request to processor 112 which transmits instructions to browser 122. Browser 122 accesses network 104 via communication device 114 in conventional manner. Typically, these steps are accomplished when user 110 types in a Uniform Resource Locator (URL) which is used by browser 122 to access device 106. The URL will usually consist of the protocol and the switch host name, such as "http://bswitch1/", for example. Using the URL, Network 104 locates device 106 and transmits the request to web server 142. Web server 142 transmits a signal to data sampling engine 138 which automatically and periodically downloads data corresponding to information regarding device 106 to web server 142. Web server 142 then downloads a document written in HyperText Markup Language (HTML) containing the device information via network 104 to client 102 which is then processed by browser 122 and enables user 110 to remotely manage device 106.

In a preferred embodiment, the HTML document which is first downloaded is a Fabric View. Preferably, Fabric View is a Java Applet that shows all switches 106 in a fabric. The applet size is automatically scaled according to the number of switches in the Fabric. Preferably, each switch is represented on display 120 by a small graphic view of the switch, the worldwide name, the domain ID, and the Internet Protocol (IP) number or host name. Using input device 118, user 110 may double-click on any switch which allows user 110 to perform administrative functions on the particular switch.

Thus, the present invention advantageously allows a user to remotely manage a device over a network. Preferably, web server 142 transmits a java applet to user 110. Because the present invention utilizes java, user 110 can remotely manage device 106 and enjoy photo-graphical quality device presentation regardless of the computer terminal used by user 110 to access device 106. In other words, the present invention is platform independent and does not depend on the configuration of client 102.

Figure 2:
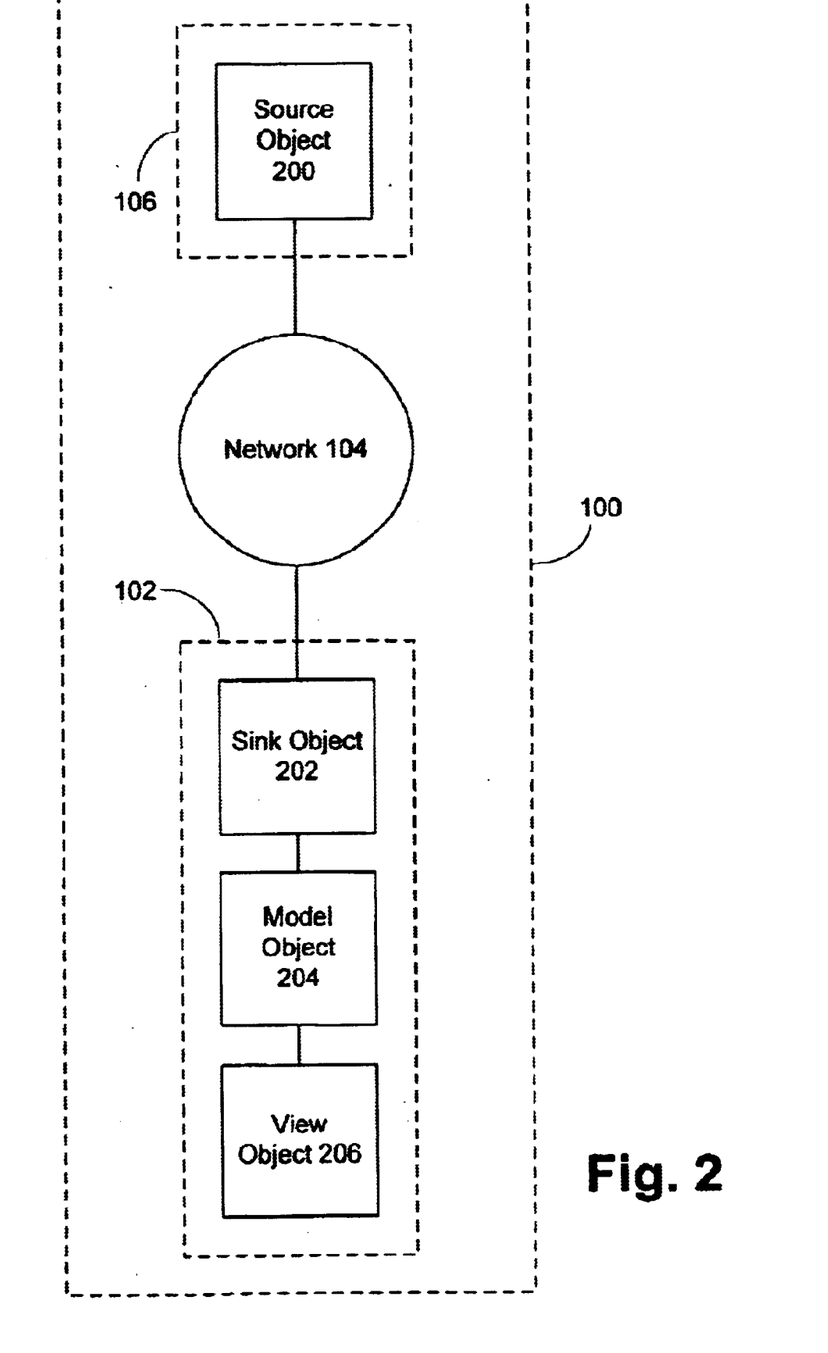
FIG. 2 is a top-level functional block diagram of the network system in accordance with one embodiment of the present invention.

Referring now to FIG. 2, a functional block diagram of a network system architecture in accordance with a preferred embodiment of the present invention is shown. Preferably, a source object 200 is coupled to a sink object 202 through conventional connections. Sink object 202 is coupled in conventional manner to model object 204 which in turn is coupled in conventional manner to view object 206. In a preferred embodiment, source object 200 is data sampling engine 138 and is located in device 106, and sink object 202, model object 204 and view object 206 are located in memory 116 in client 102. One skilled in the art will realize that other configurations of source object 200, sink object 202, model object 204, and view object 206 could be used within the scope of the present invention. For example, sink object 202 could be located in device 106 and model object 204 and view object 206 could be located in memory 116 of client 102.

Source object 200 runs on a single thread and is sampled periodically to provide real-time or new data from device 106 to sink object 202. Sink object 202 transmits the data to model object 204 which organizes the new data obtained from device 106 into manageable modules. Model object 204 compares the newly transmitted data with the most recently stored or old device data and determines whether or not there has been a change in the new data. If model object 204 detects a change in the new device data, a signal is transmitted to view object 206. View object 206 is responsible for graphically displaying the new data on display 120. View object 206 determines whether to repaint the corresponding view sub-components or to initiate a pop-up help dialog. If view object 206 needs to repaint display 120 using new device data, view object 206 retrieves the new device data from model object 204. View object 206 then repaints a portion of the display corresponding to a graphical representation of the new device data. The operation of source object 200, sink object 202, model object 204, and view object 206 are described in more detail below with reference to FIGS. 3–10.

In a preferred embodiment, the new device data and the old device data correspond to information from the device regarding a particular component module of the device. Moreover, in a preferred embodiment, each component module has its own corresponding model object and view object. For example, if device 106 is a fibre channel switch, the switch may include an internal fan for cooling the switch and a thermometer for indicating the temperature of the switch, both of which can be remotely managed over a network using the present invention. The internal fan and thermometer are both separate component modules of the device and each have a separate corresponding graphical representation on display 120. Moreover, in this example, the internal fan has a corresponding internal fan model object and a corresponding internal fan view object for processing data regarding the internal fan. Similarly, the thermometer has a corresponding thermometer model object and a corresponding view object for processing data regarding the thermometer. Although the present description only describes two possible component modules, one skilled in the art that the present invention may comprises many components modules each having its own corresponding model object and view object and corresponding graphical representation on the display. In a preferred embodiment where the device is a fibre channel switch, the present invention includes four model objects, a SwitchModel, a PortModel, a FanModel, and a ThermoModel for processing and storing data concerning general information about the switch, ports in the switch, fans in the switch, and a thermometer in the switch, respectively. Preferably, the present invention also includes a SwitchView object, three FanView objects, a ThermoView object, 16 PortLEDView objects, 16 PortModelView objects, 8 PortLoopSymbol objects, a PortAlert object, a PortPerformanceView object, and a PortDetailView object, for displaying the corresponding component module and its status in display 120.

Thus, data corresponding to a particular component module of a device is transmitted to and processed by the corresponding model object and view object of the present invention. For example, when source object 200 is sampled to retrieve data regarding the internal fan, it provides new internal fan data from device 106 to sink object 202. Sink object 202 transmits the new internal fan data to model object 204 which compares the new internal fan data with the most recently stored or old internal fan data and determines whether or not there has been a change in the new internal fan data. A change in the new internal fan data may occur if the internal fan has stopped functioning since the last time data regarding the internal fan was retrieved, for example. If model object 204 detects a change in the new internal fan data, a signal is transmitted to view object 206. Model object 204 then stores new internal fan data. View object 206 determines whether to repaint the graphical representation of the display corresponding to the internal fan or to initiate a pop-up help dialog. If view object 206 needs to repaint display 120, view object 206 retrieves the new internal fan device data from model object 204. View object 206 then repaints only that portion of the display corresponding to the graphical representation of the internal fan without having to repaint the entire switch or device display.

Thus, the present invention advantageously reduces screen flickering which is typically caused by painting large scale graphics on a display. Because each component module of device 106 is processed by its own corresponding model object and view object, and is represented by a separate graphical representation on display 120, a large scale animated graphical display of device 106 can be updated and repainted frequently without the disadvantages of the prior art.

Figure 3:
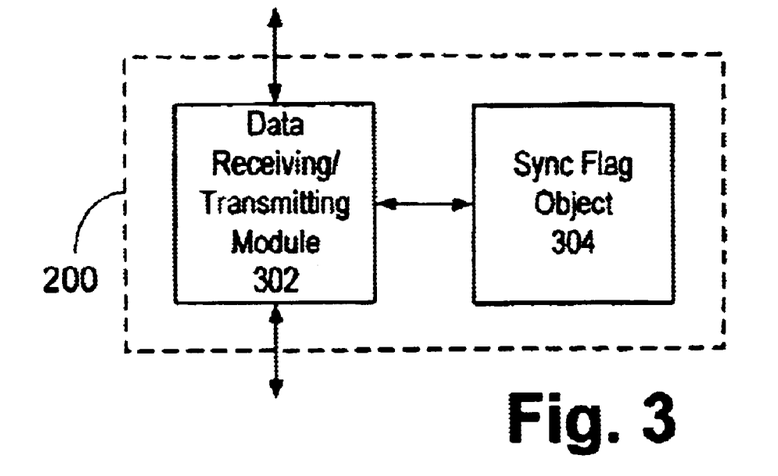
FIG. 3 is a functional block diagram of a preferred embodiment of a source object in accordance with the present invention.

Referring now to FIG. 3, there is shown a functional block diagram of a source object 200. Source object 200 is preferably a data sampling engine 138 located in device 106. Data sampling engine 138 comprises a data receiving/transmitting module 302, and a SyncFlag object 304. At specified time intervals, data sampling engine 138 receives data from device 106 in data receiving/transmitting module 302. SyncFlag object 304 is a timing mechanism which determines the intervals for retrieving data from device 106 and in a preferred embodiment, enables data sampling engine 138 to receive data from device 106 every second.

Figure 4:
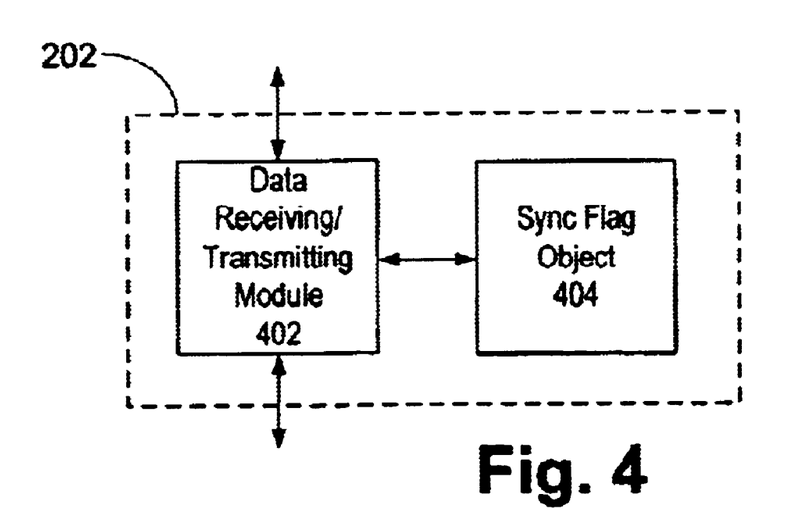
FIG. 4 is a functional block diagram of a preferred embodiment of a sink object in accordance with the present invention.

Referring now to FIG. 4, there is shown a functional block diagram of a sink object 202. Sink object 202 comprises a data receiving/transmitting module 402, and a SyncFlag object 404. At specified time intervals, sink object 202 retrieves data from source object 200 by reading data from an HTML file generated by source object 200. SyncFlag object 404 is a timing mechanism which determines the intervals for retrieving data from device 106 and in a preferred embodiment, is synchronized to SyncFlag object 304 in source object 200.

Figure 5:
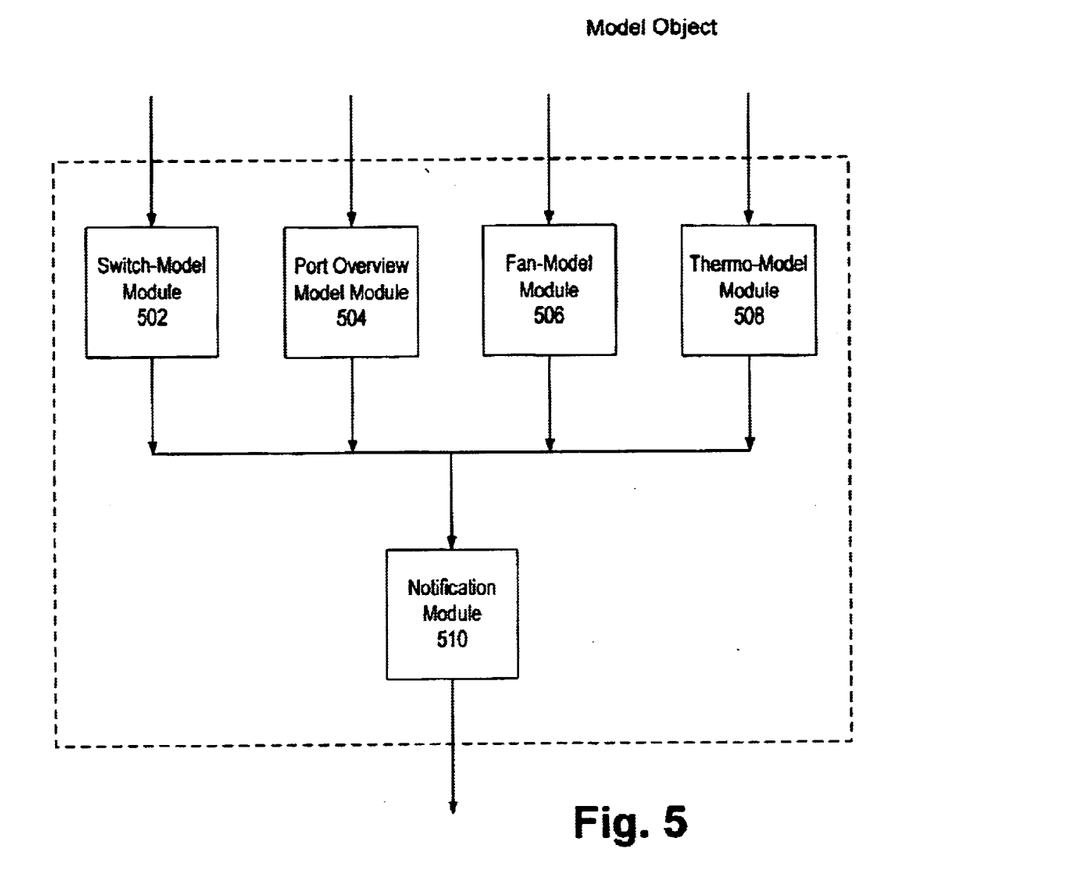
FIG. 5 is a functional block diagram of a preferred embodiment of a model object in accordance with the present invention.

Referring now to FIG. 5, a functional block diagram of a preferred embodiment of model object 204 is shown. Model object 204 comprises at least one model module corresponding to each component module of device 106 for which information or data is to be stored and displayed on display 120. For example, when device 106 is a fibre channel switch, model object 204 preferably comprises a SwitchModel module 502, a PortOverviewModel module 504, a FanModel module 506, and a ThermoModel module 508. Each model object module may contain device data corresponding to one particular device component or several device components. One skilled in the art will realize that any number of modules may be used within the scope of the present invention and that each model module may correspond to device data from a single component module of device 106 or from multiple component modules of device 106.

Device data from sink object 202 is transmitted to the model module which is allocated for the particular component module of device 106. For example, data from device 106 which contains information regarding an internal fan of the fibre channel switch is transmitted to FanModel module 506. FanModel module 506 compares the new fan data with the old fan data and determines whether there has been a change in the fan data. If there has been a change, FanModel module 506 transmits a signal to Notification module 510 and stores the new fan data in FanModel module 506. Notification module 510 then transmits a signal to view object 206. If there is no change, FanModel module 506 stores the new fan data.

Figure 6A:
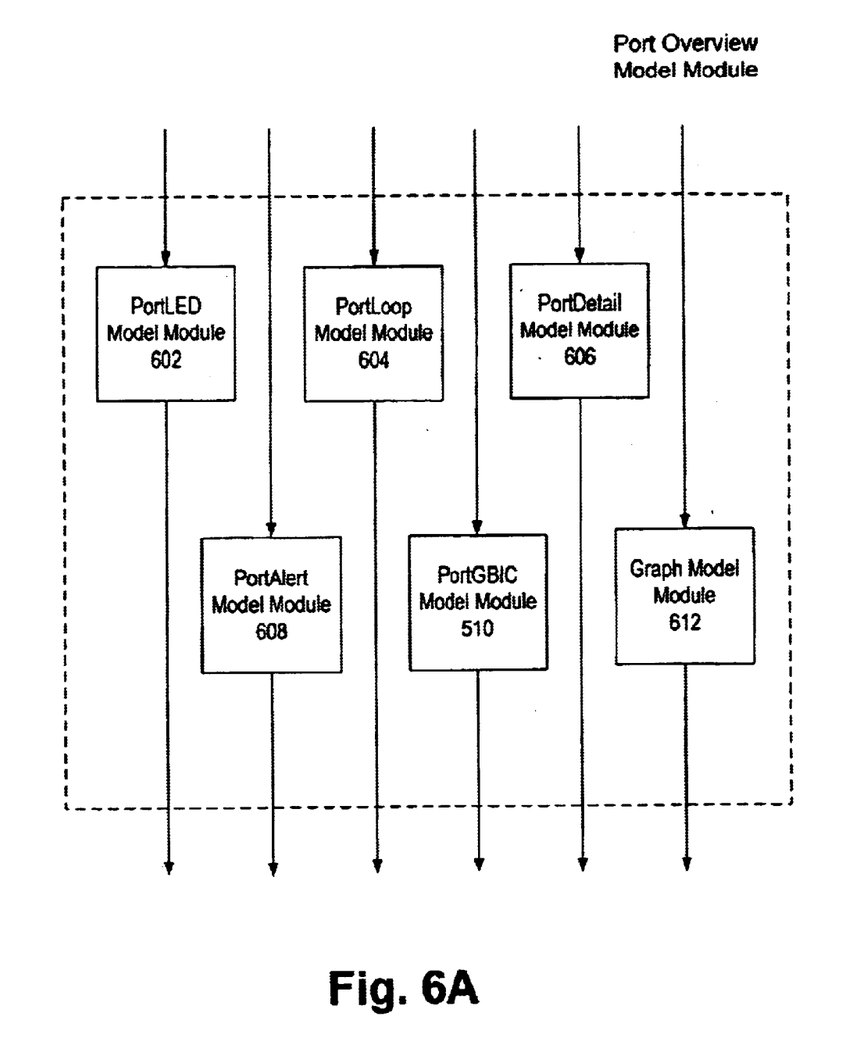
FIGS. 6A, 6B, 6C, and 6D represent a functional block diagram of a preferred embodiment of a PortModel module in accordance with the present invention, a preferred graphical representation of a view of a switch having a PortLED-Model module, a preferred graphical representation of a PortDetailModel module, and a preferred graphical representation of a GraphModel module respectively.
Figure 6B:
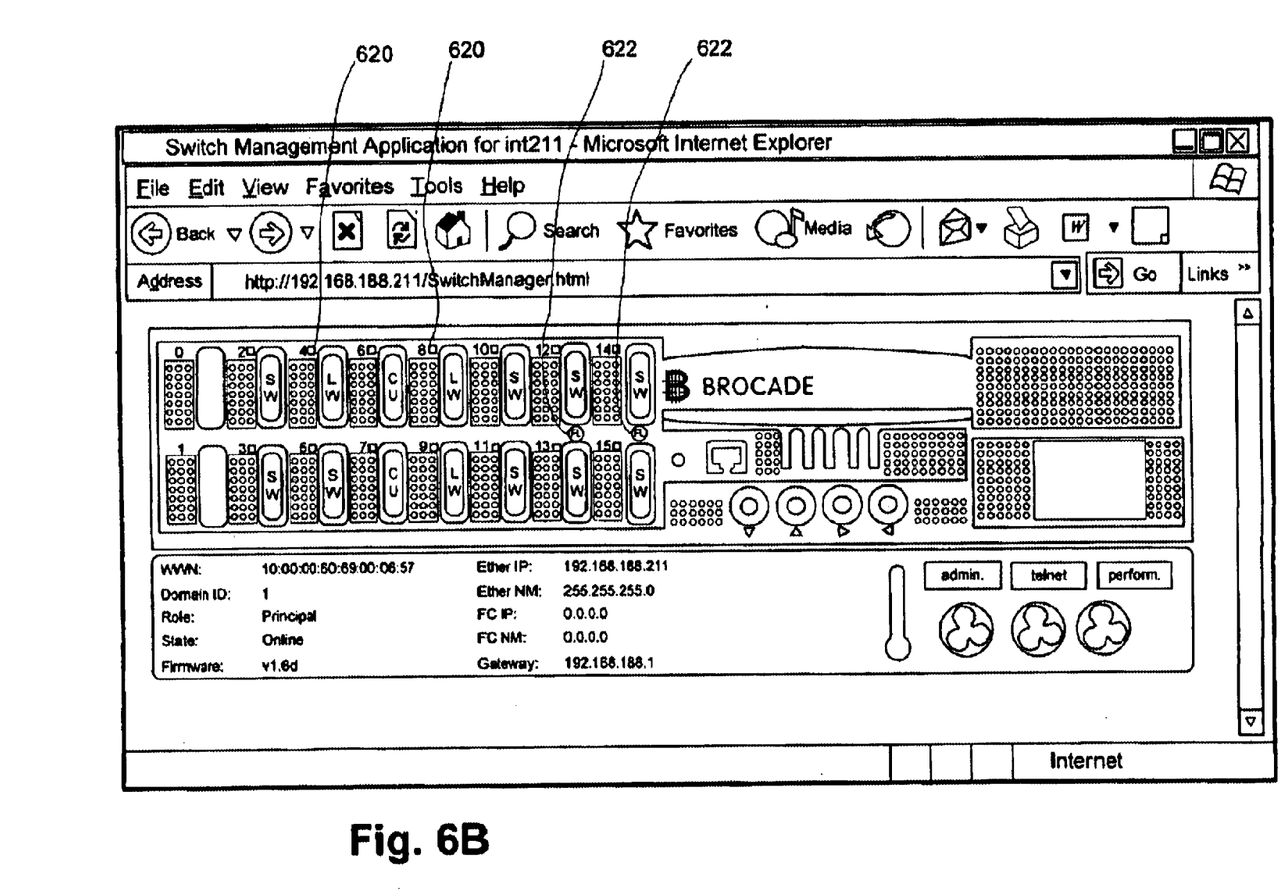
Figure 6C:
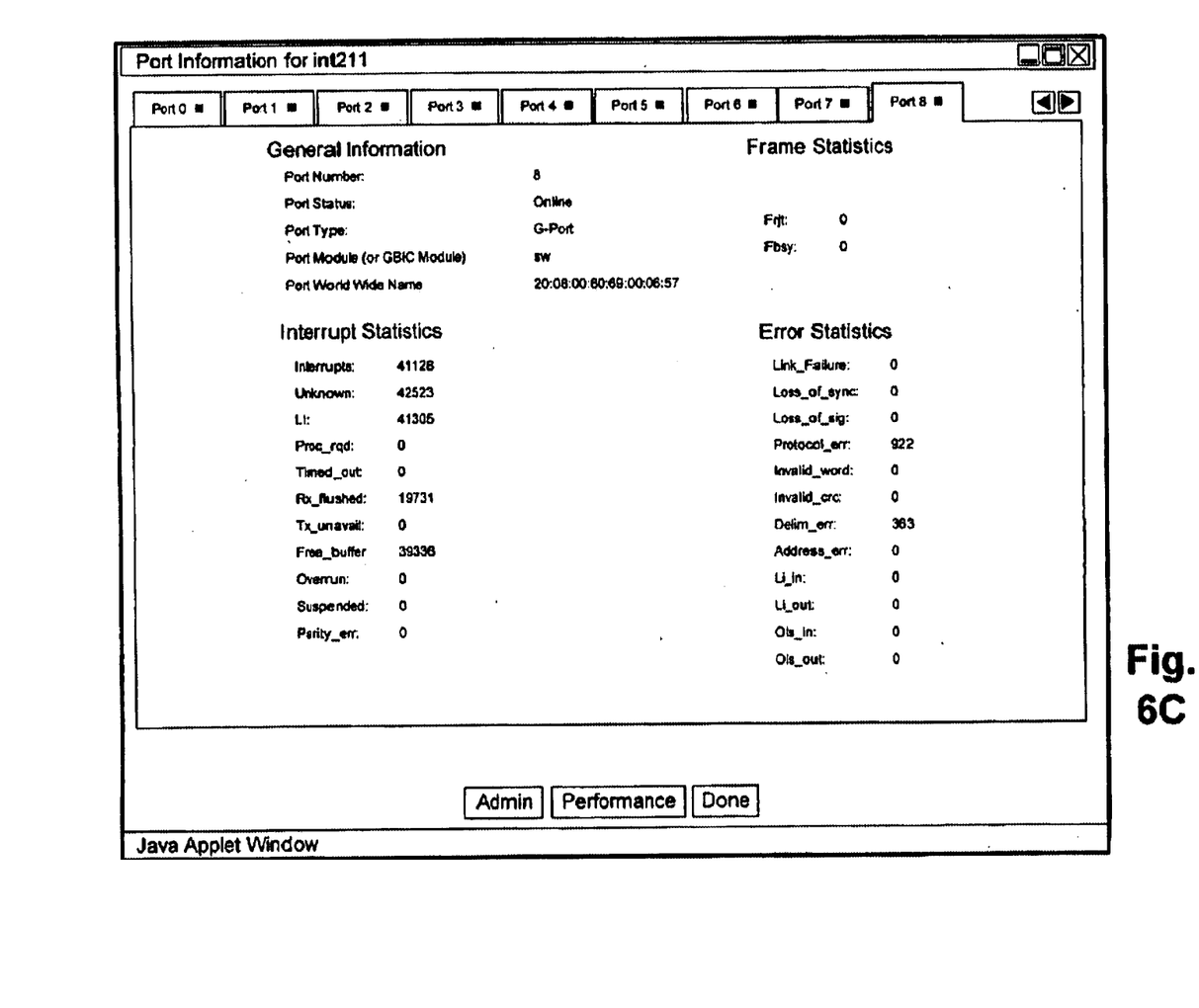
Figure 6D:
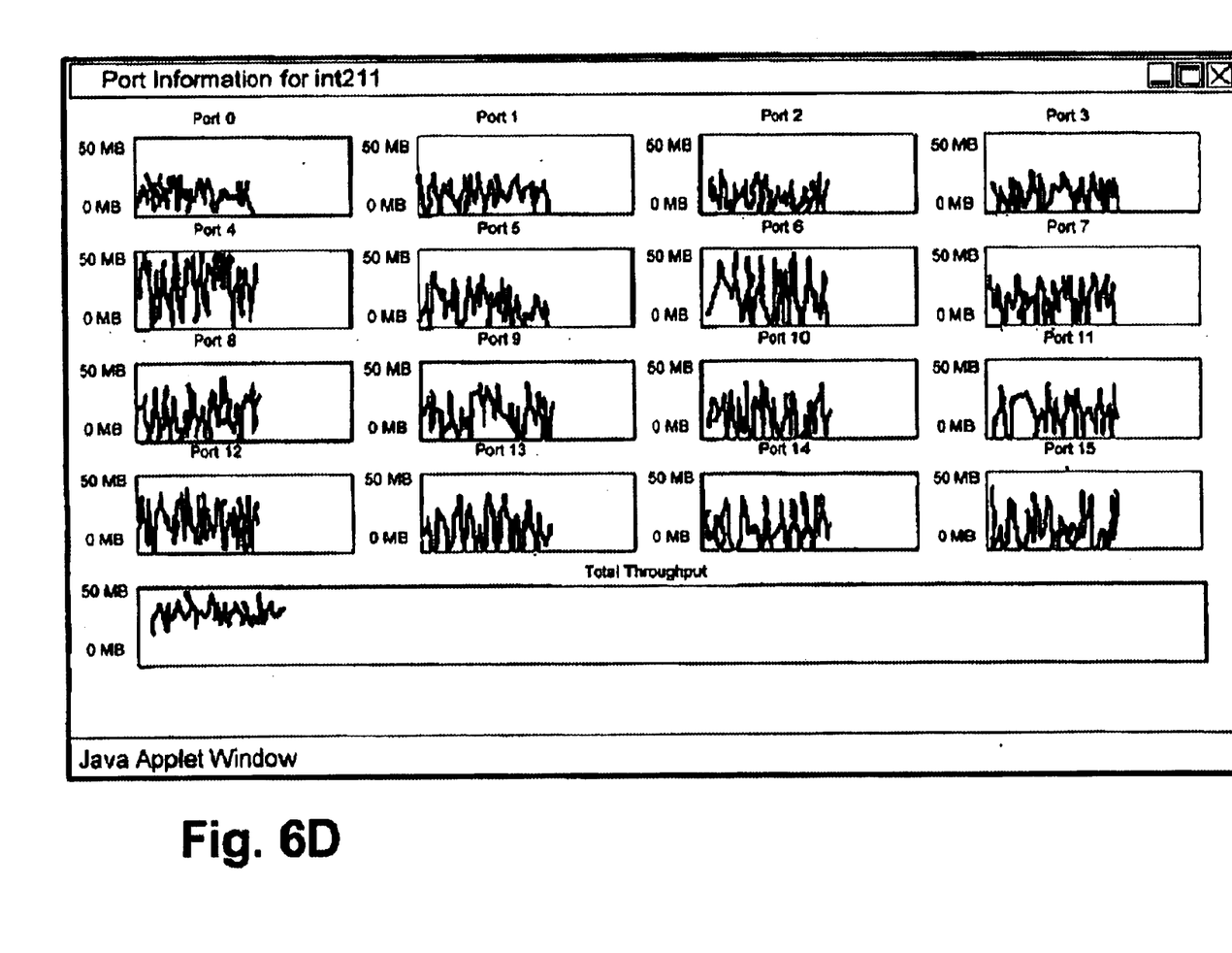

Referring now to FIG. 6A, a functional block diagram of a preferred embodiment of PortOverviewModel module 504 is shown. PortOverviewModel module 504 comprises a PortLEDModel module 602, a PortLoopModel module 604, a PortDetailModel module 606, a PortAlertModel module 608, a PortGBICModule module 610, and a GraphModel module 612. In a preferred embodiment, PortLEDModel Module 602 detects a port status change and displays a corresponding LED. Preferably, a green LED is used to indicate that network traffic is flowing smoothly, an amber LED is used to indicate that the port is offline or is having trouble, and a black LED is used to indicate that there is no GBIC module or that the port is offline. Referring now to FIG. 6B, a preferred graphical representation of a PortLEDModel 620 is shown. PortAlertModel Module 608 is responsible for displaying a Help Pop-up window when there is a port/switch status change, when the fans stop running or when there is a high temperature reading in one of the thermometers. PortLoopModel Module 604 displays a "FL" symbol in the Switch Front View if it detects a loop capable G-Port card. Referring now to FIG. 6B, a preferred graphical representation of a PortLoopModel 622 is shown. PortGBICModule Module 610 automatically detects the GBIC type (sw-for short wave length optical GBIC, lw-for long wave length optical GBIC or cu-for copper GBIC) and displays corresponding GBIC graphics. PortDetailModel Module 606 presents a foldertab looking window where all the port detailed information, such as port status information, port interrupt statistics, port frame statistics and port error statistics, are displayed. Referring now to FIG. 6C, a preferred embodiment of a PortDetailModel 606 is shown. GraphModel Module 612 consists of 16 individual port throughput graphs and one switch total throughput graph against time. Referring now to FIG. 6D, a preferred embodiment of a GraphModel is shown.

Figure 7:
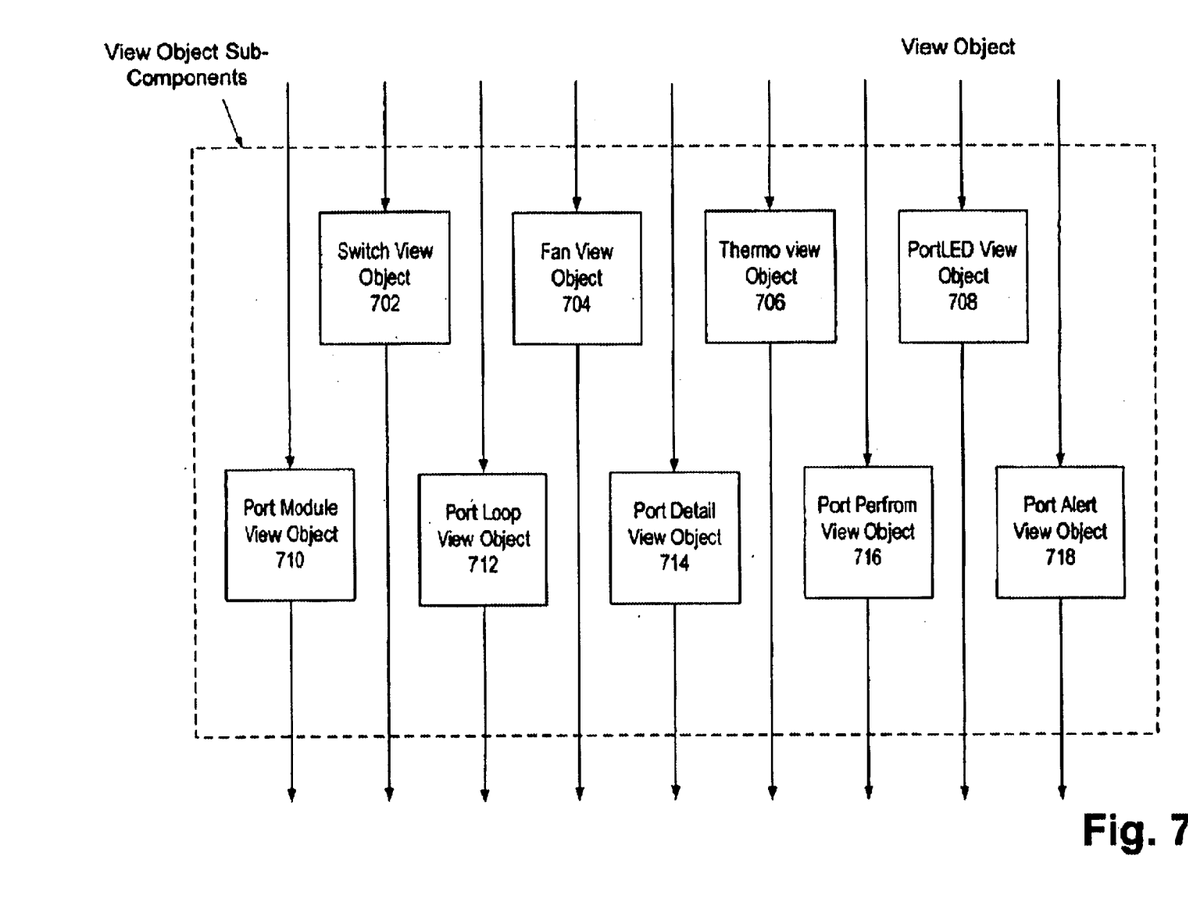
FIG. 7 is a functional block diagram of a preferred embodiment of a view object in accordance with the present invention.

Referring now to FIG. 7, a functional block diagram of a preferred embodiment of view object 206 is shown. View object 206 comprises at least one view object corresponding to each component module of device 106 for which information or data is to be stored and displayed on display 120. For example, when device 106 is a fibre channel switch, view object 206 preferably includes a SwitchView object 702, three FanView objects 704, a ThermoView object 706, 16 PortLEDView objects 708, 16 PortModuleView objects 710, 8 PortLoopView objects 712, a PortDetailView object 714, a PortPerformanceView object 716, and a PortAlertView object 718 for displaying the corresponding component module and its status in display 120. Each view object may contain device data corresponding to one particular device component or several device components. One skilled in the art will realize that any number of view objects may be used within the scope of the present invention.

A notification signal from model object 204 is received by the view object which is allocated for the particular component module of device 106. View object 206 retrieves the recently stored new data from model object 204. For example, continuing with the above example, when FanView object 704 receives a notification signal from model object 204, FanView object 704 retrieves the recently stored new fan data from FanModel module 506. Subsequently, FanView object 704 will either repaint the visual component of the screen of display 120 which graphically represents the fan component module or initiate a pop-up help dialog.

Figure 8:
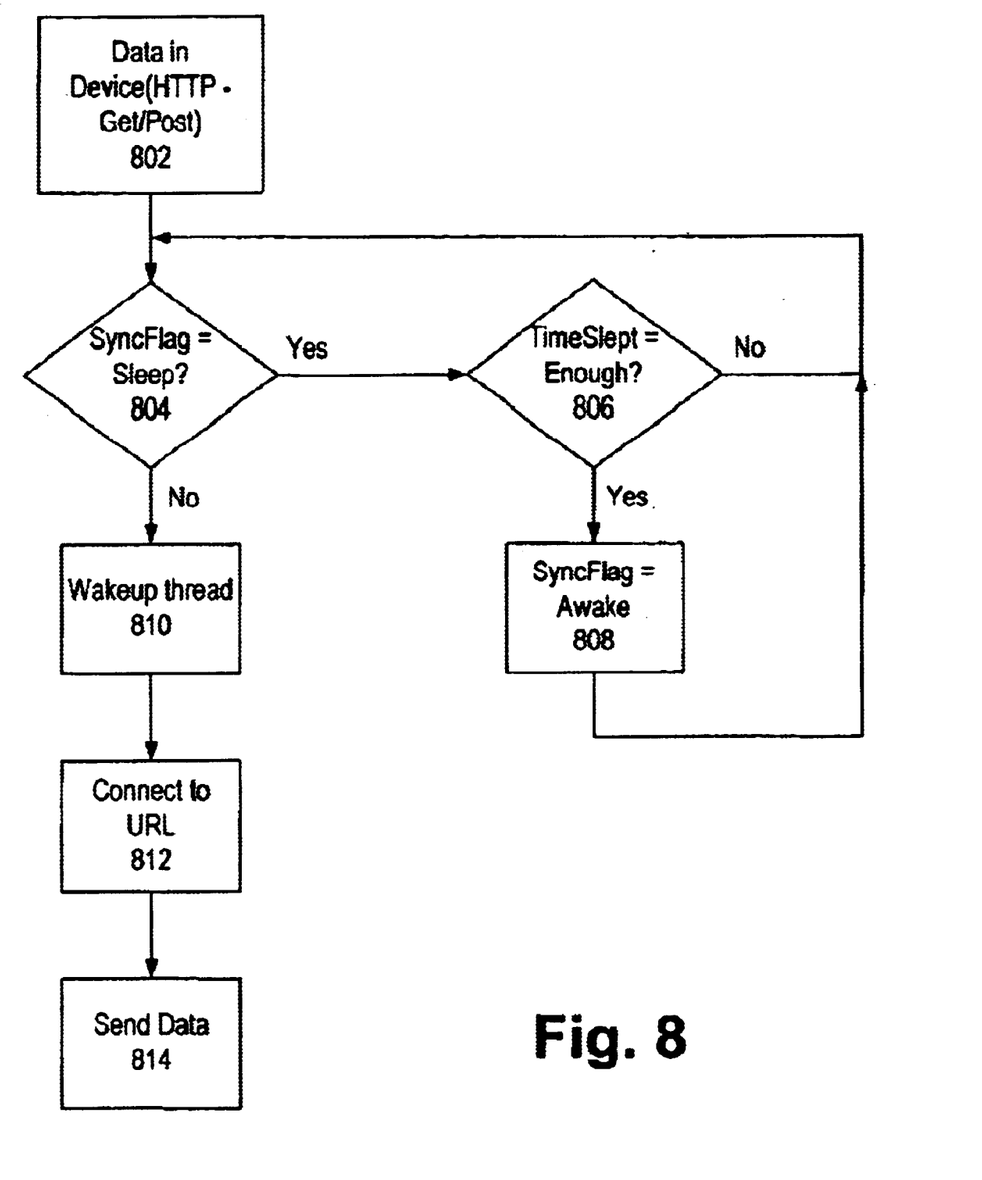
FIG. 8 is a flow chart illustrating one embodiment of the steps for transferring device data from a source object to a sink object in accordance with the present invention.

Referring now to FIG. 8, the steps of a preferred method for transmitting data from source object 200 to sink object 202 is illustrated. Source object 200 generates a HTML document containing data from the device. During the time period that user 110 is on-line and accessing device 106 as described above, the sink object 202 continually checks the status of SyncFlag object 404. First, sink object 202 determines whether SyncFlag object 404 is sleeping (804). If SyncFlag object 404 is sleeping, the process then determines whether SyncFlag has slept enough (806). If it is determined that SyncFlag has slept a required interval, SyncFlag object 404 is set to awake status (808), and the procedure returns to step 804. If it is determined that SyncFlag object 404 has not slept enough, then the procedure returns to step 404. If SyncFlag object 404 is not sleeping, the source object thread is awakened (810) i.e., it becomes active, and the next task is executed. A URL connection call in Java is made (812) to open an HTTP stream to source object 200. Source object 200 generates an HTML document (814) containing the new device information for the sink object 202 to retrieve.

Figure 9:
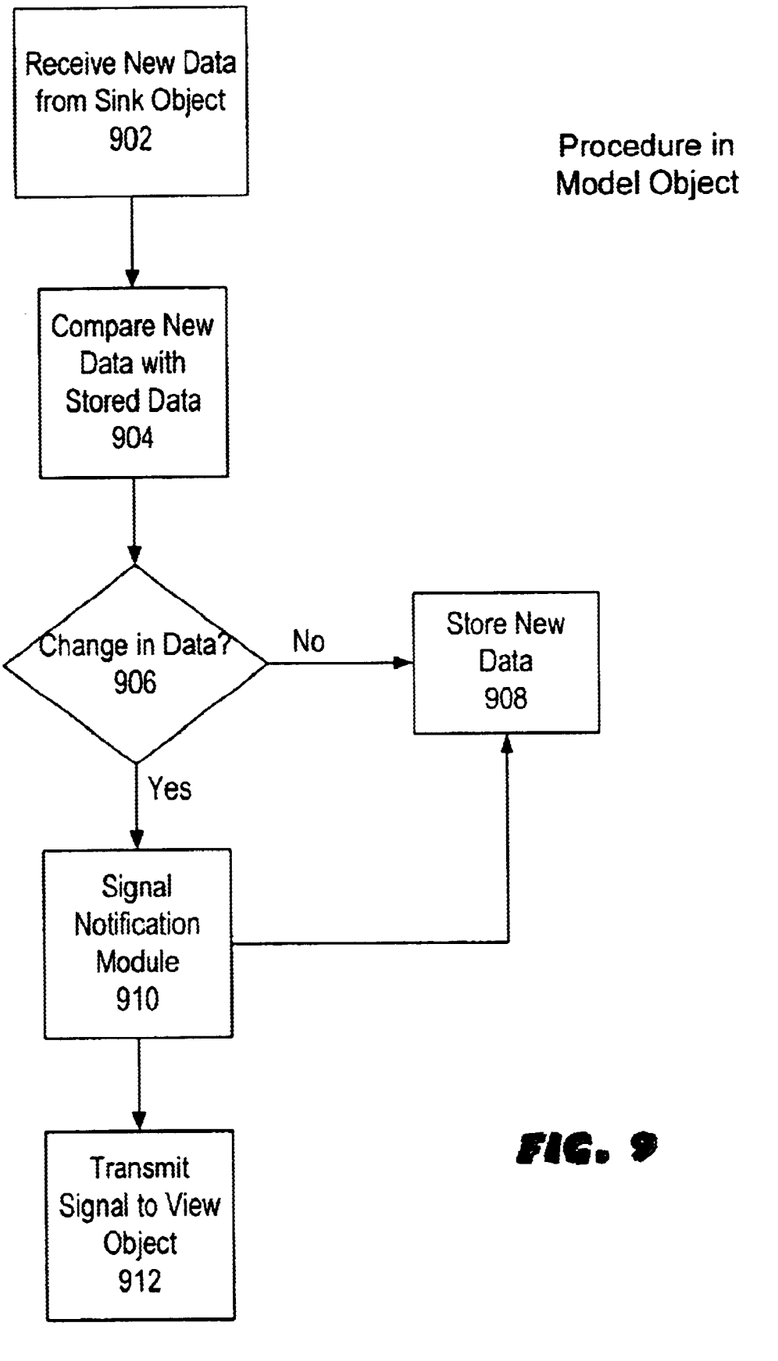
FIG. 9 is a flow chart illustrating one embodiment of the steps performed by a model object in accordance with the present invention.

Referring now to FIG. 9, the steps of a preferred embodiment of the procedure for model object 204 is shown. New device data is received (902) from sink object 202. The new device data is compared (904) with the old device data which is the most recently received data prior to the new device data. Model object 204 determines (906) whether there has been a change in the data. If there has been no change, the new device data is stored (908) in model object 204 to be used for the next comparison. If a change in the new device data is detected, a signal is transmitted (910) to Notification module 510 and the new device data is stored (908) in model object 204. Notification module 510 transmits (912) a signal to view object 206 to notify view object 206 that there has been a change in the data which corresponds to a change in a device component.

Figure 10:
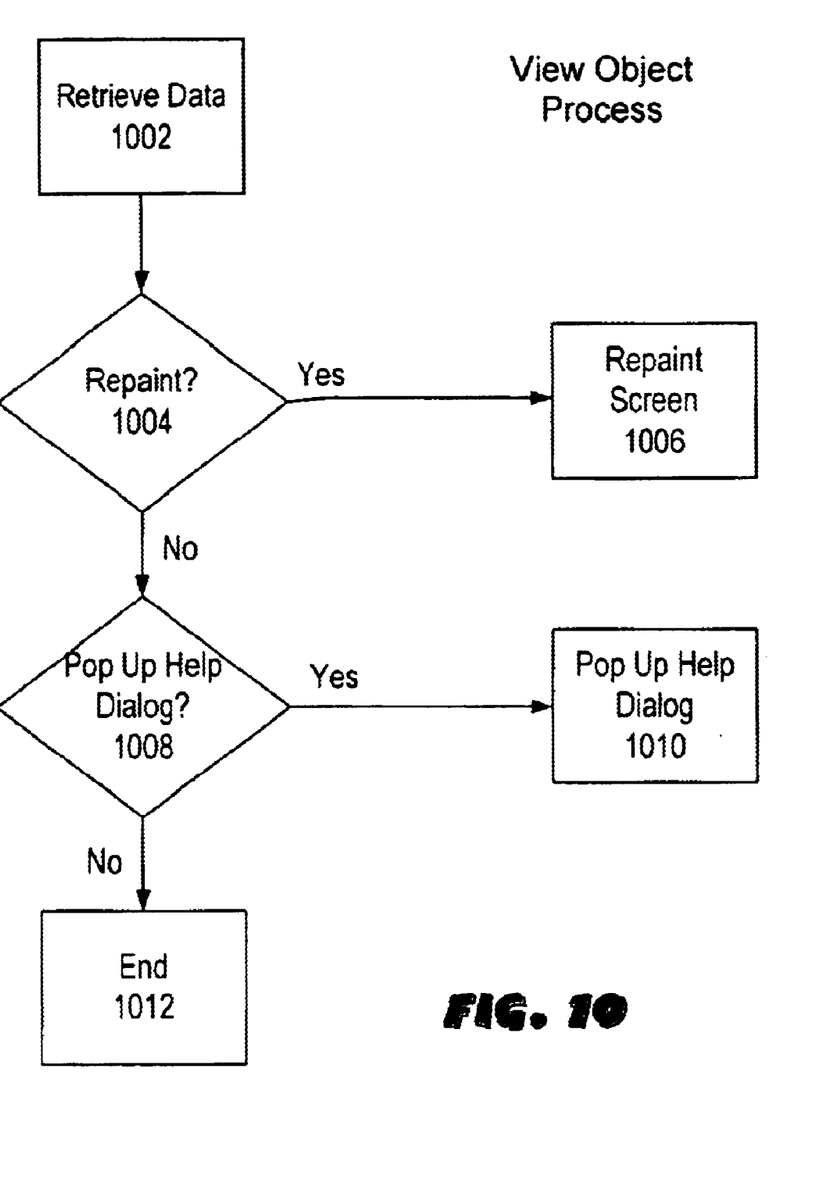
FIG. 10 is a flow chart illustrating one embodiment of the steps performed by a view object in accordance with the present invention.

Referring now to FIG. 10, the steps of a preferred embodiment of the procedure for view object 206 is shown. After view object 206 receives a notification signal from model object 206, view object 206 retrieves (1002) the data from model object 204. View object 204 then determines whether to repaint (1004) the screen. If view object 206 needs to repaint the screen, then view object repaints (1006) the portion of screen which corresponds to the particular component. In other words, the entire screen is not repainted but rather only the portion of the screen which corresponds to the component of the device for which data was obtained. If the screen is not to be repainted, then view object 206 next determines whether to initiate the pop-up help dialog (1008). If the pop-up help dialog is to be initiated, view object 206 displays the pop-up help dialog on the screen (1010). Otherwise, the procedure ends.

The individual model objects and view objects of the present invention process and store data for a particular component module of device 106. The ability of the present invention to separate and to process the data according to component modules advantageously reduces screen flickering on the display when a graphical representation corresponding to a component module of the device is repainted. Thus, the present invention advantageously enables the use of dynamic Web pages to remotely manage a device over a network.

The above description is included to illustrate the operation of preferred embodiments and is not meant to limit the scope of the invention. The scope of the invention is to be limited only by the following claims. From the above discussion, many variations will be apparent to those skilled in the art that would yet be encompassed by the spirit and scope of the invention.

What is claimed is:

1. A method for remotely managing a device over a network, the network including a data sampling engine, a view object, and a display the method comprising:
   receiving new device data from the data sampling engine, the new device data corresponding to information regarding a particular module of the device;
   comparing the new device data with a set of old device data, the old device data corresponding to information which was received prior to receiving the new device data and which regards the particular module of the device;
   transmitting a notification signal to the view object based on the comparison determining a difference between the new device data and the old device data; and
   repainting only a portion of the display which graphically represents information corresponding to the particular module of the device.

2. The method of claim 1 wherein the device comprises a Fibre Channel switch.

3. The method of claim 1 wherein the network further includes a sink object coupled to the data sampling engine, and the step of receiving new device data further comprises the substeps of:
   receiving device data from the device at a specified interval;
   opening an HTTP stream to the source object from the sink object;
   transmitting data to the sink object.

4. The method of claim 1 wherein the method is incorporated in two Java objects.

5. The method of claim 1 wherein the view object comprises a plurality of view object sub-components, each view object sub-component corresponding to a particular module of the device.

6. The method of claim 1 wherein the network further comprises a model object coupled to the view object, the method further comprising the step of: storing the new device data in the model object.

7. The method or claim 6 further comprising the steps of: retrieving the stored new device data from the model object; and repainting only a portion of the display which graphically corresponds to the new device data.

8. An apparatus for remotely managing a device over a network system comprising:
   a data sampling engine, for receiving new data from the device, the new data corresponding to a component of the device;
   a model object, coupled to the data sampling engine, for comparing the new data from the device with old data; and
   a view object, coupled to the model object, for updating only display parameters of the device corresponding to the component of the device.

9. The apparatus of claim 8 further comprising: a sink object, coupled to the data sampling engine and the model object, for retrieving the new data from the data sampling engine.

10. The apparatus of claim 8 further comprising: display, coupled to the view object, for displaying the view parameters of the device.

11. The apparatus of claim 8 wherein the device is a Fibre Channel switch.

12. The apparatus of claim 8 wherein the data sampling engine further comprises:
   a data receiving/transmitting module; and
   a SyncFlag object.

13. The apparatus of claim 8 wherein the model object further comprises:
   a SwitchModel module for automatically updating switch general information display;
   a PortOverviewModel module for updating all port information display;
   a FanModel module for updating fans' status display; and
   a ThermoModel module for updating thermometer status display.

14. The apparatus of claim 13 wherein the PortOverviewModel module further comprises:
   a PortLED model module for LED color changing concerning a specific port status;
   a PortLoop model module for indicating whether a G-port board is a loop-capable board;
   a PortDetail model module for displaying port general information, error statistics, interrupt statistics and frame statistics; and
   a PortAlert model module for poping up warning messages when port or switch status changes.

15. The apparatus of claim 8 wherein the view object comprises a plurality of view object sub-components, each view object sub-component representing a module of the device.

16. A system for remotely managing a device over a network system having a display, comprising:
   a data sampling engine for receiving new data from the device at a specified time interval, the new data corresponding to information regarding a component module of the device;
   a model object for receiving the new data from the data sampling engine in response to a request from a user, the model object comparing the new data with a set of old data in order to determine whether a change has occurred in the component module of the device; and
   a view object for painting only a portion of the display corresponding to a graphical representation of the component module of the device.

17. The system of claim 16 wherein the device comprises a fibre channel switch.

18. The system of claim 16 wherein the device comprises a plurality of component modules.

19. The system of claim 18 wherein the model object comprises a plurality of model objects and a plurality of view objects, each of the plurality of model objects corresponding to a particular component module, and each of the plurality of view objects corresponding to a particular component module.

20. A computer storage medium containing a device management system which causes generation of a model object and a view object, the device management system comprising:
- a sink object for retrieving new data from the device, the new data corresponding to a component module of the device;
- a model object, coupled to the sink object, for comparing the new data from the device with old data; and
- a view object, coupled to the model object, for updating only display parameters of the device corresponding to the component of the device.

21. A computer storage medium whose contents cause a computer to remotely manage a device having a data sampling engine, a view object, and a display by:
- receiving new device data from the data sampling engine, the new device data corresponding to a module of the device;
- comparing the new device data with stored device data;
- transmitting a notification signal to the view object based on the comparison determining a difference between the new device data and the stored device data; and
- repainting only a portion of the display corresponding to a graphical representation of the module of the device.

22. A method for remotely managing a device over a network, the network including a data sample engine and a view object, the method comprising: receiving new device data from the data sampling engine, the new device data corresponding to information regarding a particular module of the device;
- determining whether received new device data is different from a set of old device data, the old device data corresponding to information which was received prior to receiving the new device data and which regards the particular module of the device;
- transmitting a notification signal to the view object in response to the result of determining the difference between received new device data and the set of old device data; and
- repainting only a portion of a graphical representation of information corresponding to the particular module of the device in response to the notification signal.

23. A system for remotely managing a device over a network system, the system comprising:
- a model object for receiving new data from the device in response to a request from a user, the new data corresponding to information regarding a component module of the device, the model object comparing the new data with a set of old data in order to determine whether a change has occurred in the component module of the device, the model object transmitting a notification signal in response to comparing the new data with the set of old data and determining a difference; and
- a view object configured to instruct repainting only a portion of a graphical representation of information corresponding to the particular module of the device in response to receiving the notification signal.

\* \* \* \* \*